(12) United States Patent
Kashiwada

(10) Patent No.: US 7,313,704 B2
(45) Date of Patent: Dec. 25, 2007

(54) CONTROL SYSTEM HAVING DOWNLOAD FUNCTION

(75) Inventor: Takeshi Kashiwada, Inagi (JP)

(73) Assignee: Fujitsu Limited, Kawasaki (JP)

( * ) Notice: Subject to any disclaimer, the term of this patent is extended or adjusted under 35 U.S.C. 154(b) by 770 days.

(21) Appl. No.: 10/622,509

(22) Filed: Jul. 21, 2003

(65) Prior Publication Data

US 2004/0107237 A1    Jun. 3, 2004

Related U.S. Application Data

(63) Continuation of application No. PCT/JP01/00356, filed on Jan. 19, 2001.

(51) Int. Cl.
| | |
|---|---|
| G06F 21/00 | (2006.01) |
| G06F 15/16 | (2006.01) |
| H04L 9/00 | (2006.01) |

(52) U.S. Cl. .................. 713/191; 726/30; 717/173
(58) Field of Classification Search ................ None
See application file for complete search history.

(56) References Cited

U.S. PATENT DOCUMENTS

| | | | | |
|---|---|---|---|---|
| 5,907,617 | A  * | 5/1999 | Ronning | 705/52 |
| 6,317,162 | B1 | 11/2001 | Matsumoto | 348/553 |
| RE38,236 | E  * | 8/2003 | Kubota et al. | 380/45 |
| 6,978,152 | B1 * | 12/2005 | Yamaashi et al. | 455/526 |
| 7,233,997 | B1 * | 6/2007 | Leveridge et al. | 709/229 |
| 2001/0014884 | A1 * | 8/2001 | Dillard et al. | 705/57 |
| 2002/0016910 | A1 * | 2/2002 | Wright et al. | 713/150 |
| 2002/0049853 | A1 * | 4/2002 | Chu et al. | 709/237 |
| 2002/0055910 | A1 * | 5/2002 | Durbin | 705/64 |
| 2004/0003266 | A1 * | 1/2004 | Moshir et al. | 713/191 |
| 2004/0268006 | A1 * | 12/2004 | Kang et al. | 710/303 |

FOREIGN PATENT DOCUMENTS

| | | |
|---|---|---|
| JP | 04-175952 | 6/1992 |
| JP | 09-282155 | 10/1997 |
| JP | 10-027097 | 1/1998 |
| JP | 11-015672 | 1/1999 |
| JP | 05-173892 | 7/1999 |
| JP | 11-184705 | 7/1999 |
| JP | 11-265282 | 9/1999 |
| JP | 2000-137607 | 5/2000 |
| JP | 2000-315157 | 11/2000 |

* cited by examiner

*Primary Examiner*—Christopher Revak
(74) *Attorney, Agent, or Firm*—Staas & Halsey LLP

(57) ABSTRACT

A control system having a download function includes a first storage area for storing execution program data for executing a control function in a rewritable status, a second storage area for storing a download module containing fresh pieces of update target execution program data and module identifying information, a first control unit for receiving the download module encrypted by an encryption key generated from the same program data as the execution program data stored in the first storage element and from the module identifying information, and storing the received download module in the second storage element, and a second control unit for decrypting the download module by an encryption key generated from data in the execution program data in the first storage area and from data of the download module in the second storage area and replacing, when a storage start address, a data length and a check digit that are encrypted in the download module are decrypted into valid values in a plain text, the execution program data in the first storage area with the fresh execution program data decrypted.

20 Claims, 8 Drawing Sheets

CONTROL SYSTEM HAVING DOWNLOAD FUNCTION

This application is a continuing application, filed under 35 U.S.C. §111(a), of International Application PCT/JP01/00356, filed Jan. 19, 2001, the disclosure of which is herein incorporated by reference.

BACKGROUND OF THE INVENTION

The present invention relates generally to a control system having a download function for receiving an execution program of a control function from a host control system and updating this execution program, and more particularly to a control system having a download function for safeguarding the system from programs which do not run correctly and are unlawful and for enabling system functions to be recovered even if failing to download.

With advancements and a spread of microprocessors, a variety of peripheral devices are so designed as to be controlled by programs, and their functions become complicated. Further, with an advent of new technologies such as E-commerce, etc., a security against a forgery, an unlawful act, etc. is strongly demanded of the system.

For example, in a password (personal identification number (PIN)) input function of an automatic machine (a cash dispenser (CD) or an automatic teller machine (ATM)) for accepting a cash accounting process in a way that surrogates a service window at a bank, a conventional method is that a control unit of the automatic machine directly processes signals from a key pad and the password is sent as it is to a host computer system. An up-to-date method, however, takes such an architecture that an input unit structured for the security accepts an input of the password and transfers the encrypted password to the control unit of the automatic machine. This architecture makes it difficult to steal the password either by a physical method or by a logical method.

Moreover, there is a technical trend toward a method that is more complicated and has a higher security in terms of an encryption algorithm and a management of an encryption key than before.

A majority of functions required of a peripheral system are actualized by software, and besides improvements of the functions are properly requested. Hence, there are proposed and carried out a variety of program download methods for updating an execution program of the control function of the peripheral system without any necessity of replacing physical parts.

In terms of the security, however, there exist a risk of stopping functions of the peripheral system i.e., a control system (which will hereinafter be referred to as a download control system in some cases) having a download function due to a download of an unlawful program and a risk of allowing the unlawful act to be conducted.

Further, there might be cases in which a wrong program is downloaded though not from a deliberate unlawful act, and the download control system falls into an unusable state due to an occurrence of an unexpected fault such as a disconnection of the power source in the middle of downloading.

An auto recovery function is effective in preventing a halt of the function of the download control system, however, a retry can be made after the auto recovery even if an error occurs in downloading an unlawful program created, resulting in encouraging a development of the unlawful program on a trial-and-error basis.

There is a method of preventing the wrong download by setting a version number (a version serial number) in the program transmitted from the host control system, and comparing this number with a program version number already stored on the download control system. Namely, an unexpected download is detected and inhibited in a way that does not accept downloading programs other than those having the consecutive version numbers.

Further, what is known as a technique of detecting the error in downloading is an error detection technique such as check sum, BCC (Block Check Code), etc. of padding a check digit.

An invention aiming at preventing a download target program from being fabricated and falsified and at detecting an error in download program data, is a [File Load System] disclosed in Japanese Patent Application Laid-Open Publication No. 5-173892. This system schemes to encrypt the program data and utilize a check digit generated from an output thereof.

A similar invention is a [Method of Implementing Cryptographic Authentication Function] disclosed in Japanese Patent Laid-Open Publication No. 9-282155. This method schemes to load and decrypt a program encrypted or undergoing a digital signature when executing this program and to erase the program code after the execution thereof.

It is also self-evident that a public-key cryptography for encrypting the download target program with a public key and decrypting the downloaded program data with a secret key generated in a download control system, ensures a security for the download target program.

The following is inventions of technologies for restoring the function when falling into a failure in downloading. To be specific, one invention (titled [Download Program Compensating Device and Method thereof] disclosed in Japanese Patent Application Laid-Open Publication No. 11-184705) is that the same program is stored on a plurality of memories, a check sum for the program is periodically calculated, and, if an error is detected, the program is copied from the memory with no error occurred. Another invention (titled [Control System for Vending Machine] disclosed in Japanese Patent Application Laid-Open Publication No. 11-265282) is that a memory is segmented into two areas A and B, a new control program is downloaded into the area B in a state of executing a control program in the area A, and the control program in the area B is executed only when getting successful. Still another invention (titled [Digital Television Image Receiver] disclosed in Japanese Patent Application Laid-Open Publication No. 2000-137607) is that a piece of identifying information showing whether the download becomes successful or not is written to a non-volatile memory, and, if not successful, the download is again executed when started up.

Among the conventional technologies described above, according to the technology that does not encrypt a download module (such as the download target program data, etc.), there still exits a large possibility of obtaining and analyzing the download module, detecting a weak point in terms of security with respect to the download control system, and creating a falsified download module.

Further, the conventional technology utilizing the cryptography does not adopt any special method for generating and managing the encryption key. Accordingly, if the encryption key is obtained, it follows that even the encrypted download module is to be decrypted and altered. Management of a multiplicity of encryption keys (secret keys) while making them corresponding to the download modules, is troublesome, and it is therefore desired that the management of the encryption keys themselves be unnecessary.

Further, in case the download comes to a failure due to the unlawful act or an accident, according to the conventional technology for restoring the function of the download control system, the retry can be made from the same state owing to the restoration even if trying to download the unlawful module and ending up with a failure, thereby facilitating a development of the unlawful module.

As for the security module safeguarded physically and logically so that the internal data and program are neither stolen nor falsified, it is desirable that the program download method be adopted in order to facilitate modifying and adding the functions.

If the security module is easily decipherable, however, there must be a risk in which a logical weak point of this security module is revealed or the module is falsified for making the unlawful act.

It is also considered that an unexpected fault occurs due to mistakenly downloading a download module of a different module version number or executing a download module with an error occurred.

Such being the case, the control system having the download function of the encrypted security module is desired to meet the following requirements:

(1) Neither an unintended module having a different module version number nor a module with a data error occurred shall be accepted;

(2) If an error occurs midways of downloading (a download failure), a downloaded program shall be by no means executed;

(3) Even if the download falls into a failure, a function of the security module shall be restorable by downloading once again;

(4) The program shall not be decipherable from the download module;

(5) A downloadable download module shall not be creatable by falsifying the normal download module;

(6) A download try-and-error attempt for developing an unlawful download shall be restricted;

(7) The normal download module shall be downloaded without any necessity of inputting a keyword, and so on. Namely, redundant pieces of security data such as the keyword, etc. shall be unnecessary; and (8) Any special data requiring a special management for the encryption key, the keyword, etc. shall not be used.

SUMMARY OF THE INVENTION

It is a primary object of the present invention to provide a method capable of making it difficult to decrypt a download target program and to create and develop a downloadable unlawful program, and also safeguarding from an incorrect download.

To accomplish the above object, a first control system having a download function according to the present invention includes a first storage element storing execution program data for executing a control function in a rewritable status, a second storage element storing a download module containing fresh pieces of update target execution program data and module identifying information, a first control unit receiving the download module encrypted by an encryption key generated from the same program data as the execution program data stored in the first storage element and from the module identifying information, and storing the received download module in the second storage element, and a second control unit decrypting the download module by an encryption key generated from data in the execution program data in the first storage element and from data of the download module in the second storage element and replacing, when a storage start address, a data length and a check digit that are encrypted in the download module are decrypted into valid values in a plain text, the execution program data in the first storage element with the fresh execution program data decrypted.

A second control system having a download function according to the present invention further includes a third control unit making the download module receivable that contains the fresh execution program data for only a predetermined fixed period of time after starting the download function.

A third control system having a download function according to the present invention further includes a fourth control unit making the download module receivable that contains the fresh execution program data by restarting the download function when receiving a specified reset command in a state of being unable to receive the download module.

A fourth control system having a download function according to the present invention further includes a third storage element storing a loader executed first when starting the download function, storing the download module in the second storage element and executing the execution program data for the control function that are stored in the first storage element.

A fifth control system having a download function according to the present invention further includes a fifth control unit making the execution program data in the first storage element executable by the loader when a check digit value obtained as a result of calculation based on all pieces of data in the execution program data in the first storage element, is coincident with data in a specified address in the execution program data in the first storage element.

A sixth control system having a download function according to the present invention further includes a sixth control unit storing the execution program data, executable and stored in the first storage element, in the third storage element stored with the loader, and restoring the control function by storing the first storage element with the loader's own execution program data in the third storage element when judging that the execution program data can not be executed as a result of checking the execution program data in the first storage element upon a startup of the loader.

A seventh control system having a download function according to present invention further includes a seventh control unit enabling the fresh execution program data to be stored by initializing the first storage element into a known status when judging that the execution program data can not be executed as a result of checking the execution program data in the first storage element upon a startup of the loader.

An eighth control system having a download function according to the present invention further includes an eighth control unit setting a queuing time till the loader's own execution program data are stored in the first storage element, and restricting a repetition of initializing the first storage element by the loader and storing the second storage element with the download module containing unlawful execution program data.

A ninth control system having a download function according to the present invention further includes a ninth control unit setting a queuing time till the first storage element is initialized by the loader, and restricting a repetition of initializing the first storage element by the loader and storing the second storage element with the download module containing unlawful execution program data.

In a tenth control system having a download function according to the present invention, the download module is structured of a fixed-length header field stored with the module identifying information containing at least a module name, a module creation date, a module version number and a storage start address, and at least one data field stored with a block length and data having a length corresponding to this block length, and there is encrypted a block having the data field containing an actual data length corresponding to the execution program data, a storage start address, the execution program data, pad data for adjusting a data length to a cipherable length and a check digit generated from the above data.

The respective schemes of the control system having the download function described above can be applied to a download control method.

A download control method according to the present invention includes storing a first storage element with execution program data for executing a control function in a rewritable status, storing a second storage element with a download module containing fresh pieces of update target execution program data and module identifying information, receiving the download module encrypted by an encryption key generated from the same program data as the execution program data stored in the first storage element and from the module identifying information, and storing the received download module in the second storage element, and decrypting the download module by an encryption key generated from data in the execution program data in the first storage element and from data of the download module in the second storage element and replacing, when a storage start address, a data length and a check digit that are encrypted in the download module are decrypted into valid values in a plain text, the execution program data in the first storage element with the fresh execution program data decrypted.

According to the present invention, the download target module encrypted by use of the already-downloaded program data and identifying information of the module that is to be downloaded herefrom, is received, thereby making it difficult to decrypt the program data, to create the unlawful downloadable program and to safeguard from an incorrect download.

Moreover, according to the present invention, it is feasible to detect a state in which the program comes to an impossible-of-execution state with the download resulting in a failure and automatically restore the system and to make it difficult to develop the unlawful program by setting an interval till the auto restoration is made.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein.

DETAILED DESCRIPTION OF THE PREFERRED EMBODIMENTS

Embodiments of the present invention will hereinafter be discussed with reference to the accompanying drawings.

[Architecture of Control Device Having Download Function]

Figure 1:
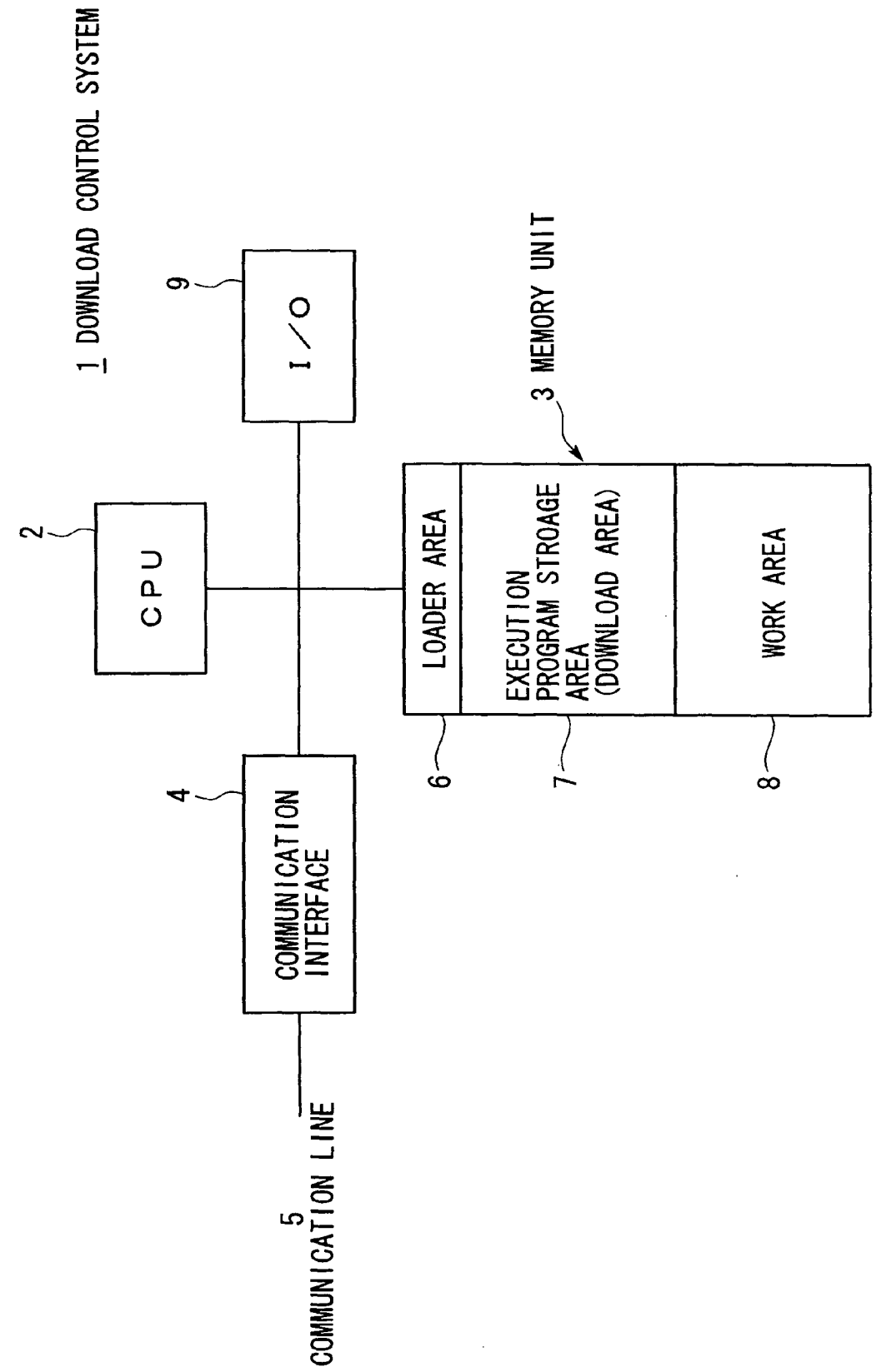
FIG. 1 is a block diagram showing an architecture of a control system having a download function in one embodiment of the present invention.

FIG. 1 shows an architecture of a control device having a download function (which is called a download control device) in one embodiment of the present invention. Referring to FIG. 1, in this download control system 1, a control unit (CPU) 2 executes in a normal status program codes (that are termed program data in some cases) stored in a download area (execution program storage area) 7 of a memory unit 3.

Further, the CPU 2 receives a command and the program data from an unillustrated host control system (host computer) via a communication interface 4 and a communication line 5, transmits a result of processing to the host control system, and controls an I/O unit 9.

The CPU 2, when rewriting the program codes stored in the execution program storage area 7 on the memory unit 3, executes a program code (loader area code 43 in FIG. 4) stored in a loader area 6 on the memory unit 3.

The memory unit 3 is structured of the loader area 6, the execution program storage area 7 and a work area 8. The loader area 6, the execution program storage area 7 and the work area 8 can be structured in a way that logically segments a storage area of the same memory device or in a way that makes different memory devices corresponding to each other.

The CPU 2 receives the download target program data via the communication interface 4, then stores the same received data in the work area 8 on the memory unit 3, and executes, as will be explained later on, if there is no error, a code (write routine) for rewriting the program data in the execution program storage area 7. This write routine is, though normally stored in the loader area 6 on the memory unit 3, copied to the work area 8 and then executed depending on a structure of the memory unit 3.

The download control system 1 includes, as the I/O unit 9, a security board, etc. for encrypting a password (personal identification number (PIN)) inputted by a customer and outputting this encrypted number to an I/O interface (not shown).

This download control system 1 can adopt any one of the existing cryptographic techniques as an encryption algorithm, however, for instance, a DES-CBC (Data Encryption Standard-Cipher Block Chaining mode) algorithm using a 64-bit key and a 64-bit initial vector, can be applied thereto.

Note that the download control system 1 may be defined as an automatic machine such as a CD (Cash Dispenser), an ATM (Automatic Teller Machine), etc. and a credit authentication terminal (CAT), or a password (PIN) processing unit thereof, however, basic functions of those devices are out of the range of the present invention, and hence their explanations are herein omitted.

[Structure of Download Module File]

Figure 2:
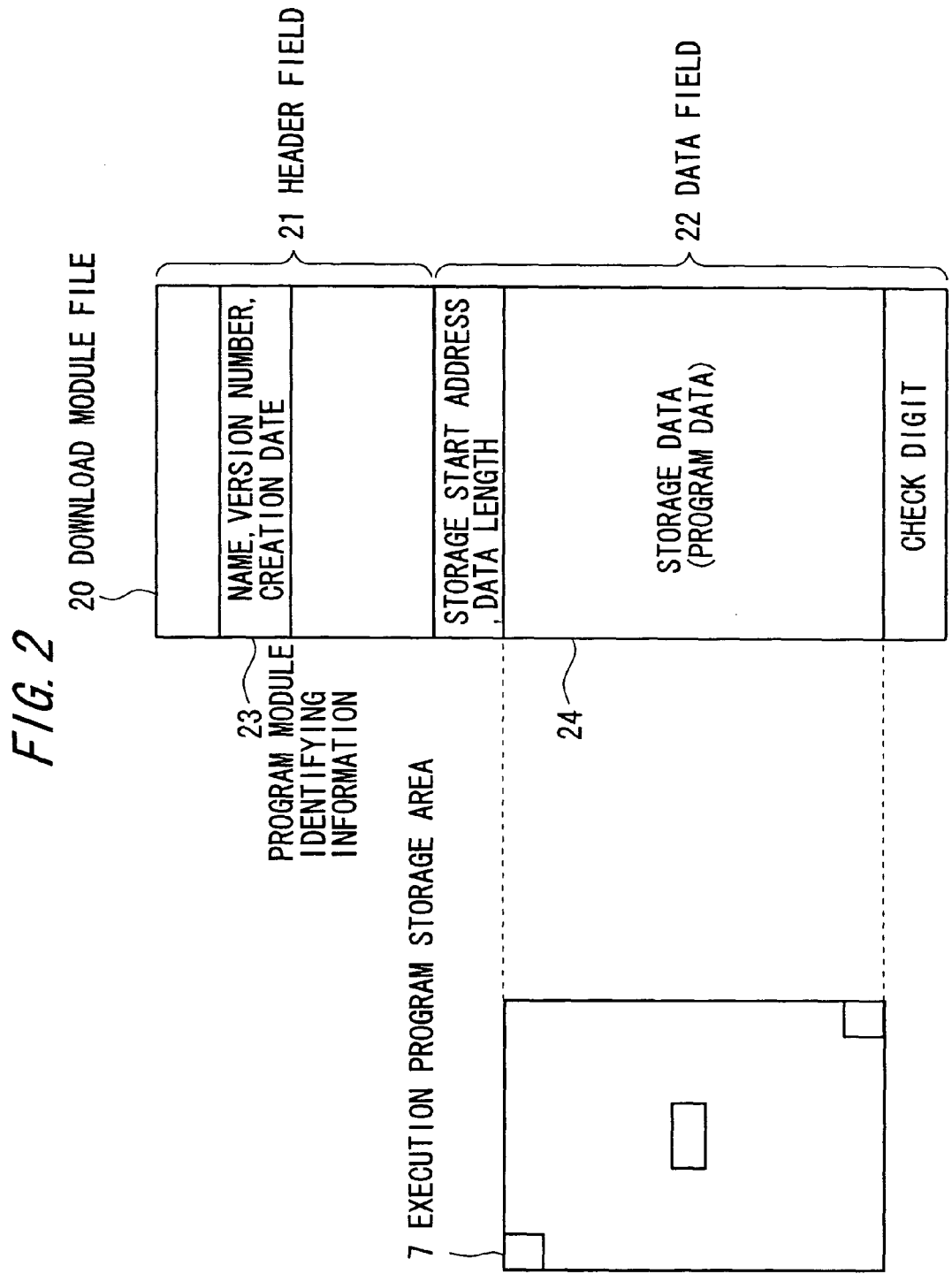
FIG. 2 is a diagram showing one example of a download module file.

FIG. 2 shows one example of a simple download module file 20. Herein, the download module is defined as a module file containing a file accessible from outside and download target program data kept in a status of communication data.

The download module file 20 is structured of a header field 21 and a data field 22. In this download module file 20, the fixed-length header field 21 has a storage area of pieces of program module identifying information 23 such as a module name, a module creation date, a module version number and a storage start address in order to manage the file itself and check an error.

Further, the data field 22 has a storage area of a storage start address and a data length, and a storage area of a check digit that are attached to storage data (program data) 24 in order to check the error.

The check digit is obtained from all of the storage start address, the data length and the storage data 24. Check sum taking a 1's or 2's complement by adding all pieces of data is a typical method in the case of obtaining the check digit.

Figure 3:
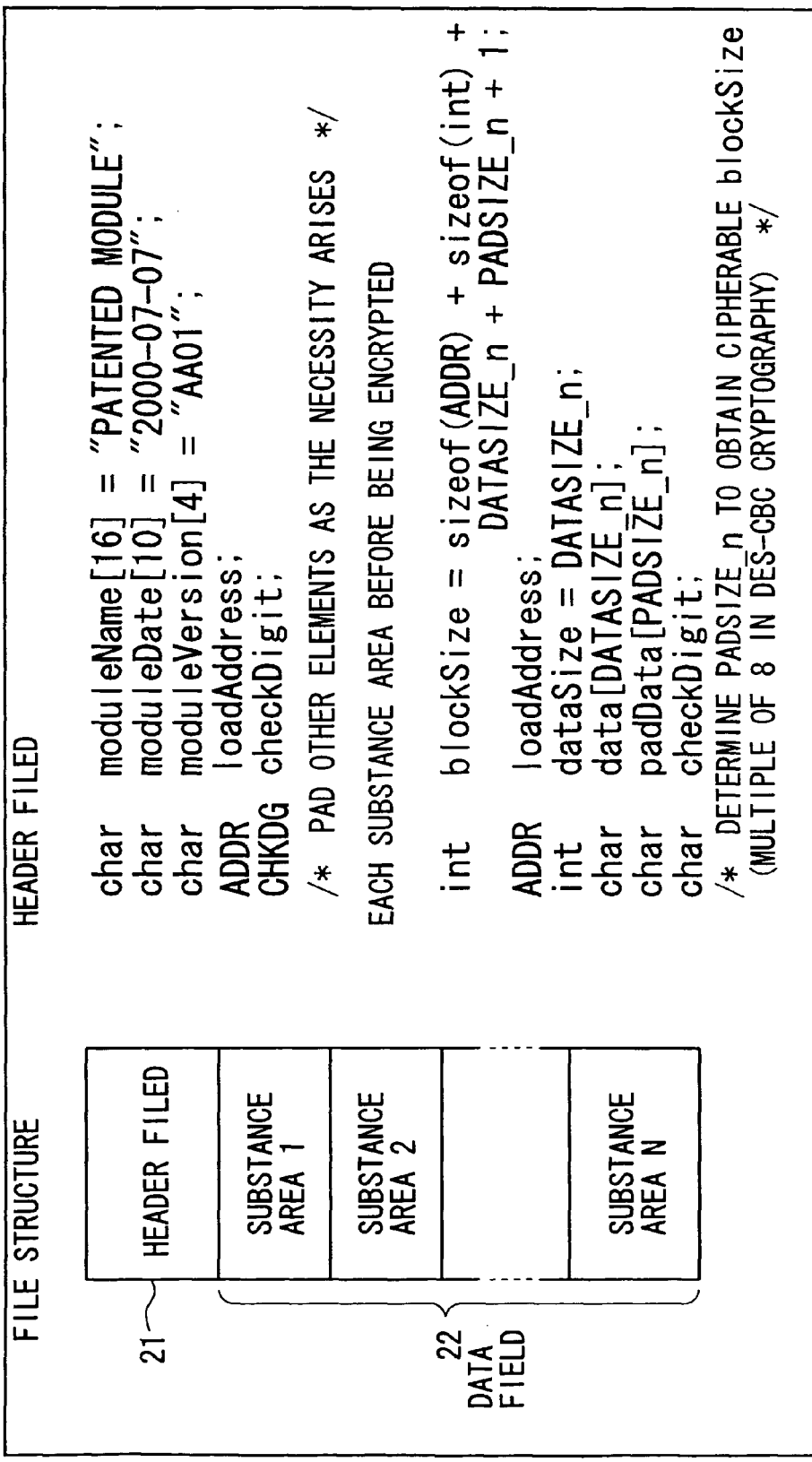
FIG. 3 is a diagram showing another example of the download module file.

FIG. 3 shows another example of the download module file 20. A difference from the download module file 20 shown in FIG. 2 is that the data field 22 is segmented into a plurality of substance areas (1, 2, . . . , N) corresponding to transmission units, whereby a communication error check is executable in each of the header field 21 and the substance areas.

An adaptation to the encryption algorithm such as DES-CBC for processing the fixed block length data involves padding a piece of pad data for adjusting the data length, i.e., for obtaining a cipherable data length, to a location posterior to the actual program data of each substance area in the data field 22.

Accordingly, this download module file 20 is structured of the header field 21 and the data field 22 containing the plurality of substance areas. In this download module file 20, the fixed-length header field 21 has a storage area of pieces of program module identifying information 23 such as a module name, a module creation date, a module version number and a storage start address in order to manage the file itself and check an error.

Further, each of the substance areas of the data field 22 has a storage area of a block length, a storage start address and a data length (actual program data length), and a storage area of a check digit that are attached to the storage data (program data) 24 in order to check the error.

The check digit is, as in the above case, obtained by adding all pieces of data and involves adopting the check sum taking a 1's or 2's complement.

The following are specific examples of the header field 21 and the data field 22 of the download module file 20 shown in FIG. 3.

```
            Header Field 21:
char        moduleName[16]="PATENTED MODULE"; . . .
            module name
char        moduleDate[10]="2000-07-07"; . . . module creation date
char        moduleVersion[4]="AA01"; . . . module version number
ADDR        loadAddress;              . . . storage start address
CHKDG       checkDigit;               . . . check digit
/*other elements are padded as the necessity may arise*/
            Each Substance Area Before Encryption of Data Field
22:
int         blockSize = sizeof(ADDR) + sizeof(int) +
            DATASIZE_n + PADSIZE_n + 1; . . . block length
ADDR        loadAddress;              . . . storage start address
int         dataSize = DATASIZE_n;    . . . data length
```

-continued

```
char        data[DATASIZE_n];         . . . data (storage data 24)
char        pad[PADSIZE_n];           . . . pad data
char        checkDigit;               . . . check digit
/*PADSIZE_n is determined to obtain possible-of-encryption
blockSize (a multiple of 8 in DES-CBC cryptography) */
```

In each of the download module files 20 shown in FIGS. 2 and 3, the data field 22 is encrypted by use of the encryption key generated based on the same program data as the data stored in the execution program storage area on the memory unit in the download target device and on the program module identifying information. The contents in each of the data fields 22 shown in FIGS. 2 and 3 are those before being encrypted.

Though will be described in depth, the download control system 1, when downloading the program data from the host control system, receives the download module files 20 shown in FIGS. 2 and 3 batchwise or in a way that segments the files.

In any file format, the storage data 24 in the data field 22 of the download module file 20 is stored in the execution program storage area 7 on the memory unit 3.

The download control system 1 having received the download module file 20 as the download target in the work area 8 on the memory unit 3, decrypts the data field 22 of the received file by use of the encryption key generated based on the old program data already stored in the execution program storage area 7 on the memory unit 3 and on the program module identifying information 23 in the header field 21 of the received file. If the storage start address, the data length and the check digit are valid, the download control system 1 stores new program data in the execution program storage area 7.

[Structure of Memory Map]

Figure 4:
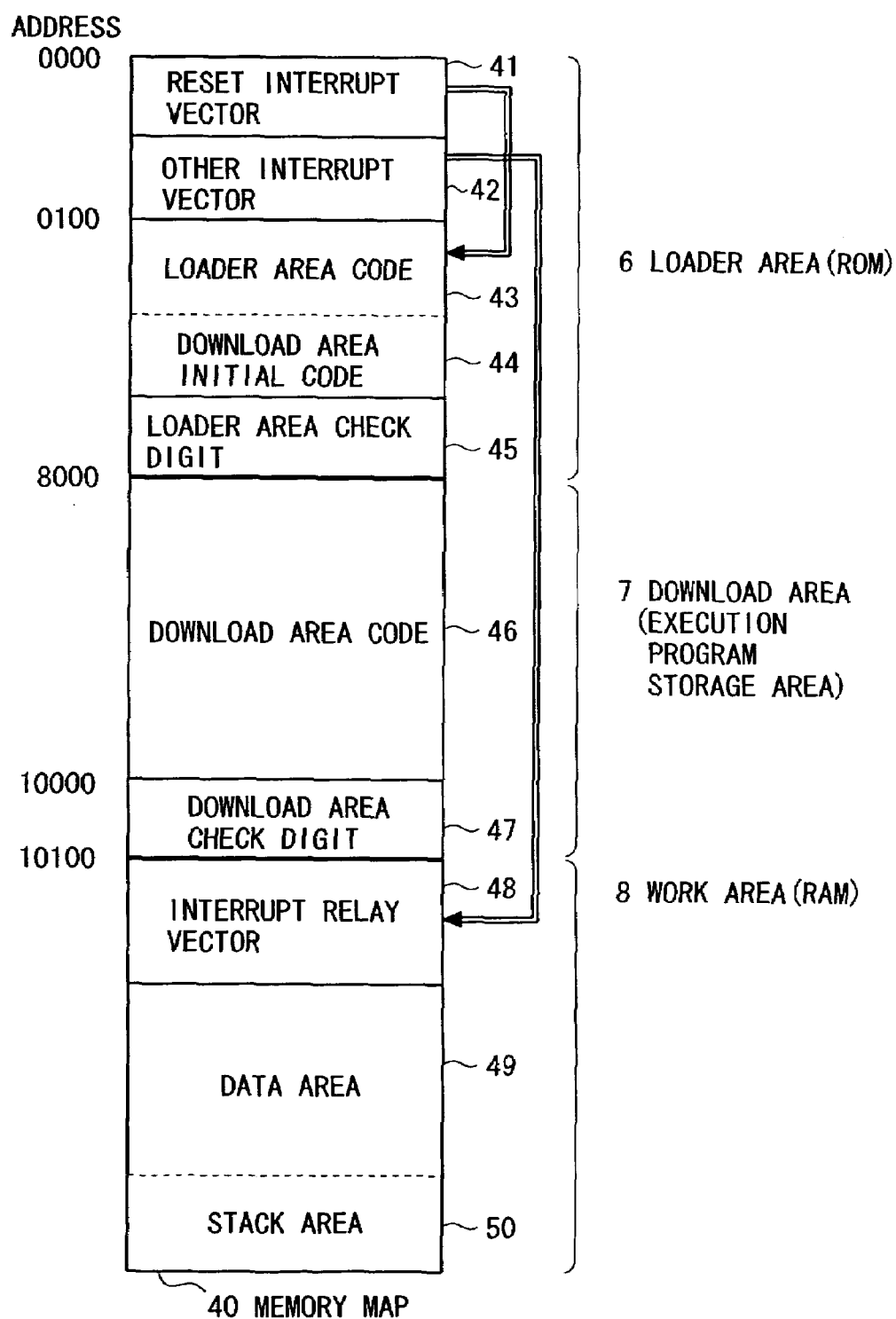
FIG. 4 is a diagram showing a structure of a memory map.

FIG. 4 shows one example of the memory map 40 on the memory unit 3 in the download control system 1.

In the memory map 40, each of the loader area 6 and the download area (execution program storage area) 7 of the memory unit 3 is constructed of a nonvolatile storage device or a circuit-structured memory (a flash ROM, for instance) in which storage contents thereof are not broken even of the power source of the download control system 1 is cut off. The work area 8 is constructed of a memory device (RAM) suited to an ever-repeating write/read process.

An assumption herein is that the CPU 2 is classified into such a type that routine addresses for resetting and an exceptional process are set in a memory address space starting from "0" address (000: hexadecimal number). An execution start address when resetting is a loader area code 43 designated by a reset interrupt vector 41, and the execution starts there from when switching ON the system power source and resetting the system.

Further, an execution start address of an other-interrupt vector 42 is so set as to jump to an interrupt relay vector 48 consisting of a jump command positioned at the head of the work area 8.

The reset interrupt vector 41 of the loader area 6 on the memory map 40 is stored with an address of the memory unit 3 that the CPU 2 executes first about after switching ON the power source of the download control system 1 or resetting the system. In this example, the executions tarts from the loader area code 43. This vector area is disposed in the memory (ROM) that is not rewritable by a CPU command so that the control system 1 does not fall into an unrecoverable state due to a failure in downloading.

The other-interrupt vector 42 is stored with an address wherein the CPU 2 executes for every interrupt factor when interrupting other than the reset interrupt. According to this embodiment, the interrupt from the communication interface 4 is utilized for efficient communications. It is required that the interrupt process be executed by the loader area code 43 during the download process and be executed by an application module, i.e., the download area code 46 during an execution of the system application.

Based on the architecture of the CPU 2, the reset interrupt vector 41 and the other-interrupt vector 42 are normally disposed in consecutive addresses. If the reset interrupt vector 41 is disposed on the ROM, the other-interrupt vector 42 is likewise disposed on the ROM and is not rewritable by the CPU command.

Therefore, the other-interrupt vector 42 is set to execute a command in a rewritable RAM area called an interrupt relay vector 48 and also set to jump therefrom to the loader area code 43 or the download area code 46.

The loader area code 43 is defined as an area for storing the CPU code for executing the download process that will be explained later on. This area 43 is disposed on the ROM so that the download control system 1 does not fall into the unrecoverable state due to the failure in downloading.

A download area initial code 44 is defined as a program code for an execution in a way that develops in the download area 7. The download area initial code 44 is, if the download area code 46 is judged to be incorrect, developed in the download area 7 and restores the basic functions of the download control system 1. For this purpose, this area 44 is disposed on the ROM.

A loader area check digit 45 is data for checking whether the contents of the reset interrupt vector 41, the other-interrupt vector 42, the loader area code 43 and the download module initial code 44 are correct or not. A simple and general method is the check sum utilizing an added value of all pieces of data on the ROM that configure the loader area 6.

The download area code 46 in the download area 7 is an area stored with an application processing code of the download control system 1. This area 46 is rewritable by the download process. A download area check digit 47 is data for checking whether the data in the download area 7 are correct or not.

The interrupt relay vector 49 in the work area 8 is an area stored with a jump command to the CPU interrupt processing routine. A data area 49 and a stack area 50 are work area necessary for executing the command codes 43, 44 in the loader area 6 or the command code in the download area 7.

[Encryption Key Data Generation Code]

The following in an exemplification of one example of an algorithm for generating the encryption key of the download target program data on the basis of the download module file 20 shown in FIG. 3 and on the memory map 40 shown in FIG. 4.

In this example, two pieces of 64-bit keys are generated directly without utilizing a Hash function algorithm (Hash technique). In this case, DES-CBC is suitable as the encryption algorithm, however, it is possible to select a size of the encryption key to be generated, a generation algorithm and an encryption algorithm to balance with a cryptographic strength, a code size and a processing speed.

```
Encryption Key Data Generation Code:

char key1[8], key2[8];
#define MEM(address) *(char*) (address) /*get the byte at address*/ void getkey (void)
{
    key1[0] = moduleDate[2]; /*year part*/ . . . module
    creation date
    key1[1] = moduleDate[3];
    key1[2] = moduleDate[5]; /*month part*/ . . . module
    creation date
    key1[3] = moduleDate[6];
    key1[4] = moduleDate[8]; /*day part*/ . . . module
    creation date
    key1[5] = moduleDate[9];
    key1[6] = moduleVersion[1]; /*version*/ . . . module
    version number
    key1[7] = moduleVersion[3];
    key2[0] = MEM(0x8001); /*memory data at address
    0x8001*/
    key2[1] = MEM(0x8002);
    key2[2] = MEM(0x9800);
    key2[3] = MEM(0x9801);
    key2[4] = MEM(0x9802);
    key2[5] = MEM(0x9802);
    key2[6] = MEM(0xFFFF);
    key2[7] = MEM(0xFFFF);
}
```

In the control system described above, when creating the download module, i.e., the download target encryption security module, the encryption key for encryption is generated from the old program data already written to the download control system 1 and from the program module identifying information 23 corresponding to new program data.

In the download control system 1 having received the encryption security module, an encryption key for decryption is generated from the old program data stored on the self-system and from new program data received. The encryption key generation method described above yields multiple advantages as will be explained later on.

[Operation of Control System Having Download Function]

VARIOUS OPERATIONAL EXAMPLES

Next, an operation of the download control system 1 described above will be explained.

(1) Referring to FIGS. 1, 2, 3 and 4 in combination, the download control system 1 stores the rewritable memory with the execution program of the control function and executes the same program. The download control system 1 receives, from the host control system via the communication interface 4, the download module file 20 containing a new execution program encrypted by the encryption key generated by synthesizing the program data in the execution program storage area 7 with the program module identifying information 23 defined as the data other than the above program data.

Thereafter, the download control system 1 decrypts the program data by the decryption key generated by synthesizing the old program data in the execution program storage area 7 with the received program module identifying information 23 and, only when the storage start address, the data length and the check digit that remain encrypted in the data field 22 of the received download module file 20 are decrypted back into valid values in a plain text, replaces (rewrites) the execution program in the execution program storage area 7 on the memory unit 3 with the thus decrypted program data. Thereafter, the new program code downloaded is executed.

In the download control system 1 having the architecture for performing this operation, the download module file 20 is encrypted, and hence the contents thereof are not known if the file 20 remains encrypted. The generation of the encryption key involves using the program code 46 stored on the download control system 1, however, there is already known the technique for preventing the program code 46 stored on the download control system 1 from being known.

In the host control system, since the encryption key is generated from the program module identifying information 23 to be downloaded, if the program module identifying information 23 is different even though the program module is absolutely the same, the encrypted download module data become completely different, and this makes it more difficult to know the program code 46 from the download module file 20 itself by deciphering the ciphers.

The scheme of padding the encrypted the storage start address, data length and check digit of the download target program data, makes it feasible to extremely increase a probability of being unable to be normally downloaded due to an error occurred in checking any one of the validity of the storage start address and a result of calculating the data length or the check digit of the decrypted program data if a part of the data is changed or added or deleted because of a communication error and falsification.

In the host control system, the encryption key is generated from the program code 46 already stored on the download control system 1 trying to download, precisely this key being generated from an original or a copy of the program code 46 held by the host control system. Therefore, in this host control system, when downloading the download module file 20 created for the download control system 1 stored with the different program code 46, an error occurs in using the encryption key generated from the program code 46 held by the download control system 1 itself, thereby making it possible to increase the probability of being unable to normally download.

Thus, the probability of succeeding in the unintentional downloading is extremely low, and therefore, in case an operator is requested to input a keyword at the execution of downloading and this keyword is not coincident with, there is no necessity of adding a scheme for security such as preventing the execution of downloading. Further, there is no necessity of using the encryption algorithm based on an asymmetric public-key cryptography (using a pair of a public key and a secret key) such as RSA (Rivest, Shamir, Adleman) system, etc., and hence the high-speed processing can be attained.

(2) In the architecture for the basic operation, the download processing program is structured so that after booting the download processing program (containing the loader), fresh pieces of execution program data can be received for only a predetermined fixed period of time, and only the basic functions essential to the system can be executed after the fixed period of time has elapsed.

This architecture prevents the unintentional downloading because of being unable to download the download module file 20 if the downloading is not started within the limited period of time after starting up or resetting the system.

(3) Further, when receiving a specified reset command from the host control system in a state where the program data cannot be received, the download processing program is rebooted, thereby enabling the program data to be received. Namely, the download processing program is structured to accept the downloading for only the fixed period of time after booting the download processing program and to enable the download processing program to be thereafter rebooted by the reset command.

With this architecture, when wishing to start downloading, the downloading can be started anytime by issuing the reset command. It takes a considerable period of time till the downloading can be started after booting the software on the host control system. It is therefore required that a downloadable time be set sufficiently long after starting up the download control system in order to surely execute the downloading by simultaneously starting up the download control system 1 and the host control system.

It is desirable in terms of security that the download control system 1 should not execute the normal functions during that period of time, however, if set so, the operation can not be immediately started. The downloading is started by restarting up the download control system 1 with the reset command, whereby a futile waiting time till the start of the operation since the system has been started up can be eliminated by reducing the downloadable time after starting (restarting) up the download control system 1.

The downloading being started after restarting the system, it is easy to structure the download processing program so that the downloading is performed without being influenced by the operation basic functions, and the reliability is enhanced.

(4) A loader for the download processing program that receives and stores the new program data, is stored on a memory device different from the memory (the execution program storage area 7) for storing the received execution program data or stored in the memory area (loader area 6). This loader is executed first when starting up the system, the program for actualizing the basic functions essential to the system is stored on the dedicated memory or in the memory area (the execution program storage area 7), and the program is executed from the loader, thus configuring such an architecture.

Namely, the memory space for storing the execution program is divided into two spaces. One memory space is used as the loader area 6 for the loader executed when starting up and resetting the system and attaining the downloading, and is structured as a nonvolatile and non-rewritable or rewrite-inhibited area. The other memory space is the execution program storage area (download area) 7 structured as a rewritable and nonvolatile area for storing the downloaded system basic function program. These areas are constructed of memory devices that are physically separated from each other, or one single memory device is segmented by address ranges.

Thus, the memory stored with the code for a procedure of the execution from the start-up to the downloading, is separated from the memory that is rewritable by the downloading, whereby the download function is not lost even if the downloading falls into a failure.

(5) Only when a value of the check digit 47 obtained from a result of the arithmetic operation using all the program codes 46 in the execution program storage area 7, is coincident with the program code 46 in the specified address in the execution program storage area 7, the loader executes the program in the execution program storage area 7.

Namely, the download processing program in the loader area is, in the operation (4) give above, structured so that the loader, when it does not execute downloading, executes the program code 47 in the execution program storage area 7, however, a calculation of the check digit 47 is performed with respect to the whole of the execution program storage area 7, and, if an error occurs, all the basic functions are stopped without making the above execution.

With this scheme, it is possible to prevent a problem from arising due to such an operation that a half-finished program code 46 due to a failure of downloading is left in the execution program storage area 7 and is, in this case, executed by accident.

(6) The program code (the download area initial code 44) executable and storable in the execution program storage area 7 is stored on the same memory device or in the same memory area as the loader is stored in. As a result of checking, upon booting the loader, the program code 46 in the execution program storage area 7, when judging that the program code 46 in the execution program can not be executed, the download area initial code 44 held on the loader side is stored in the execution program storage area 7, thereby restoring the basic functions of the system.

Namely, the download processing program in the loader area 6 is, in the operation (5) described above, structured so that when judging that the program code 46 in the execution program storage area 7 has an error, the program code (download area code) 46 is written to the execution program storage area 7 by use of the code 44 in the loader area stored with the loader beforehand, and a part of or the whole of the basis functions of the system are thereafter made executable.

With this scheme, even when failing to download, the program code 46 is automatically self-restored, and the basic functions of the system can be recovered. The program code 46 is not, however, the latest code, so that some restriction might occur.

(7) The loader is booted, and, in the case of judging as a result of checking the program code 46 in the execution program storage area 7 that the program code 46 in the execution program storage area 7 can not be executed, fresh pieces of execution program data can be surely received and stored by initializing the execution program storage area 7 into the known status.

Namely, the download processing program in the loader area 6 is, in the operation (5) described above, structured so that when judging that the program code 46 in the execution program storage area 7 has an error, the loader clears the execution program storage area 7 and returns this area 7 to the known status.

If a failure in downloading causes the half-finished program code 46 to be left in the execution program storage area 7 and if kept as it is, the program code 46 user for decryption becomes unknown, and the download module file 20 that is downloadable can not be created. The above area is cleared back into the known status, and the download module file 20 corresponding to this status can be thereby created and downloaded.

(8) Before storing the execution program storage area 7 with the execution program data held on the loader side, i.e., with the download area initial code 44 in the loader area 6, the loader executes nothing for a considerable period of time, thereby restricting a repetition of initializing the execution program storage area 7 and storing an unlawful execution program code.

Namely, the download processing program in the loader area 6 is structured so that nothing is executed for a predetermined period of time till the start of the initialization of the code 46 in the execution program storage area 7 since it has been judged in the operation (6) described above that the error occurred.

Owing to this scheme, even if trying to repeatedly performing experimental downloading for the purpose of deciphering the download module file 20 and creating an unlawful download module file 20, a next trial can not be made each time the downloading ends up with a failure unless there must be a wait for a considerable period of time. It is therefore feasible to eliminate almost all the possibility of a successful attack by diminishing the evil intention of this attack.

(9) In the operation (7) explained above, before initializing the execution program storage area 7, the loader executes nothing for a considerable period of time, thereby restricting the repetition of initializing the execution program storage area 7 and storing the unlawful execution program code. That is, the download processing program in the loader area 6 is structured so that nothing is executed for the predetermined period of time till the execution of clearing the execution program storage area 7 since the judgement of error.

With this scheme, it is possible to eliminate almost all the possibility of the successful attack by diminishing the evil intention of the repetitive attacks described above.

(10) The download module file 20 consists of the fixed-length header field 21 stored with the program module identifying information 23 containing the module name, the module creation date, the module version number and the storage start address, and the plurality of data fields 22 each stored with the storage start address, the block length and the data having its data length corresponding to this block length.

This data field 22 has a structure of encrypting the block containing the storage start address, the actual data length, the storage data (program data), the pad data for adjusting the data length to a cipherable length, and the check digit generated from these elements.

The download control system 1 having received this file 20 decrypts the data field 22 in the received file 20 on the basis of the program data already stored in the execution program storage area 7 and the program module identifying information 23 in the header field 21 of the received file 20. If the storage start address, the data length and the check digit are valid, the download control system 1 stores the execution program storage area 7 with fresh pieces of program data in the received file 20.

To be more specific, the header field 21 in the download module file 20 is stored with the download module identifying information 23 containing the module name, the module creation date and the module version number.

The download target program data is segmented to sizes each suited to the communication error check, wherein each segmented data is padded with the storage start address, the data length, the pad data for adjusting to a data length requested by the adopted encryption algorithm and the check digit calculated from these elements and from the download target program data, thus structuring one data block (data field) 22. The thus structured data block is encrypted and disposed continuously subsequent to the header field 21, thus forming the download module file 20.

The encryption key used for the encryption is generated from the program code 46 stored at present in the execution program storage area 7 on the download control system 1 as a download execution system and from the download module identifying information 23 in the header field 21 of the download module file 20.

A part of the encryption key contains the download module identifying information 23, and therefore, even if trying to download a wrong download module file 20, the encryption key does not get coincident. Consequently, an error occurs at a decrypting stage, whereby the wrong downloading can be prevented. Further, the download target data field 22 is segmented, thereby making it possible to omit a segmented data field 22 corresponding to a memory area having no necessity of downloading. This enables a time required for downloading to be reduced.

(Outline of Download Process)

Figure 5:
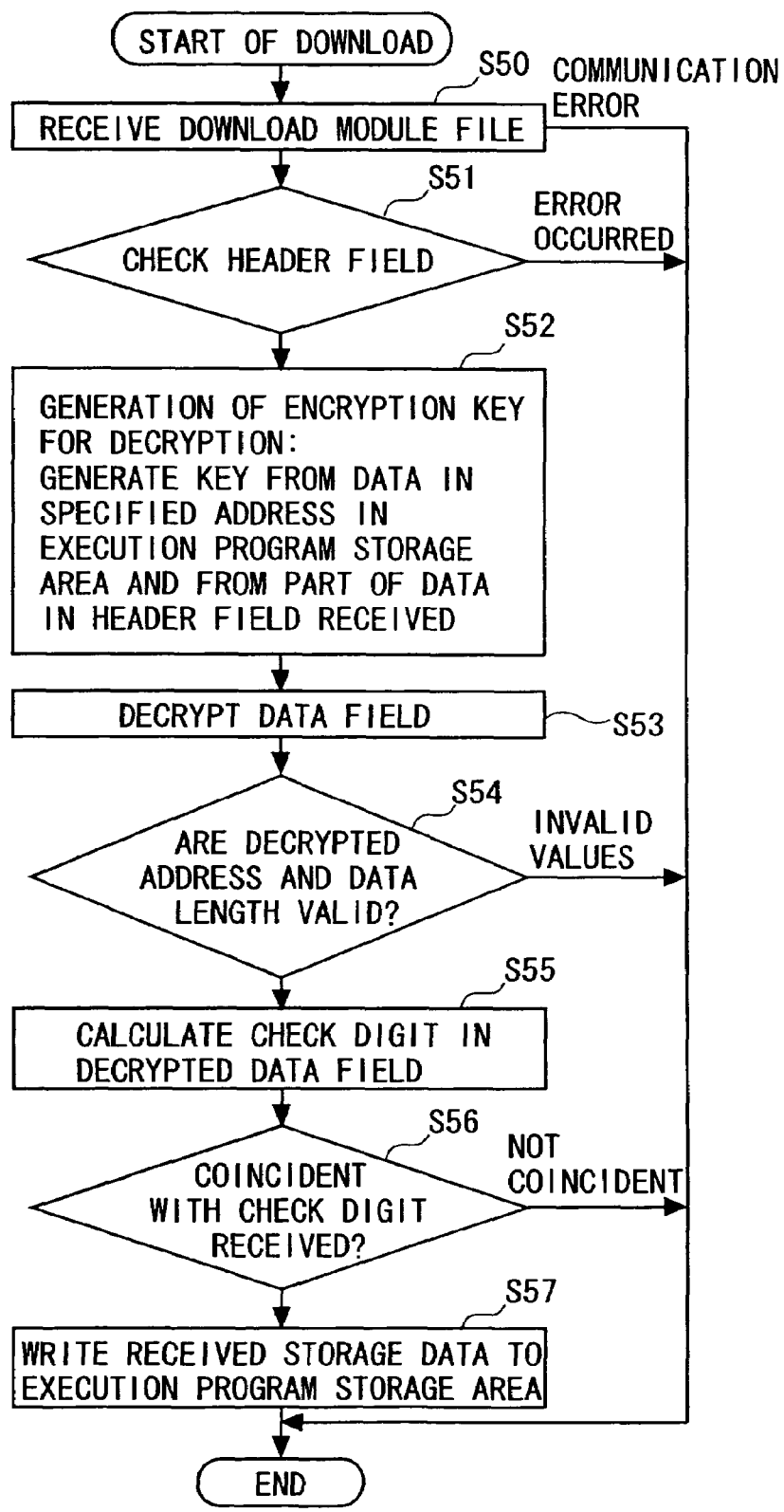
FIG. 5 is an explanatory flowchart showing an outline of a download process.

Next, an outline of a download process will be explained referring to FIGS. 1, 2 and 5 in combination. FIG. 5 shows processing steps in a case where the download control system 1 shown in FIG. 1 downloads the download module file 20 formatted as shown in FIG. 2 from the host control system.

In this case, the download module file 20 as a download target is encrypted by the encryption algorithm described above in the host control system. In the download control system 1, the CPU 2 executes the download processing program code stored in the loader area 6 on the memory unit 3.

The CPU 2 receives the encrypted download module file 20 from the host control system via the communication line 5 and the communication interface 4 as well, and stores this file 20 in the work area 8 on the memory unit 3 (processing step S50). The CPU 2, if no communication error occurs, checks the header field 21 in the download module file 20 received (S51).

If normal, the encryption key for decryption is generated (S52). This encryption key for decryption is generated from the old program data already stored in a specified address in the execution program storage area (download area) 7 and from some items of data in the header field 21 of the received file 20. Some items of data to be herein utilized in the header field 21 are the module name, the module creation date and the module version number that are contained in the program module identifying information 23.

Next, the CPU 2 decrypts the data field 22 of the file 20 (S53), and judges whether or not the decrypted storage start address and data length are valid (S54). If valid, a check digit in the decrypted data field 22 is calculated (S55).

The CPU 2 then judges whether or not the calculated check digit in the data field 22 is coincident with the check digit in the data field 22 of the received file 20 (S56). If the check digits are coincident with each other, the receiving program data stored in the work area 8 on the memory unit 3 is written to the execution program storage area 7 (S57).

(Details of Download Process)

Figure 6:
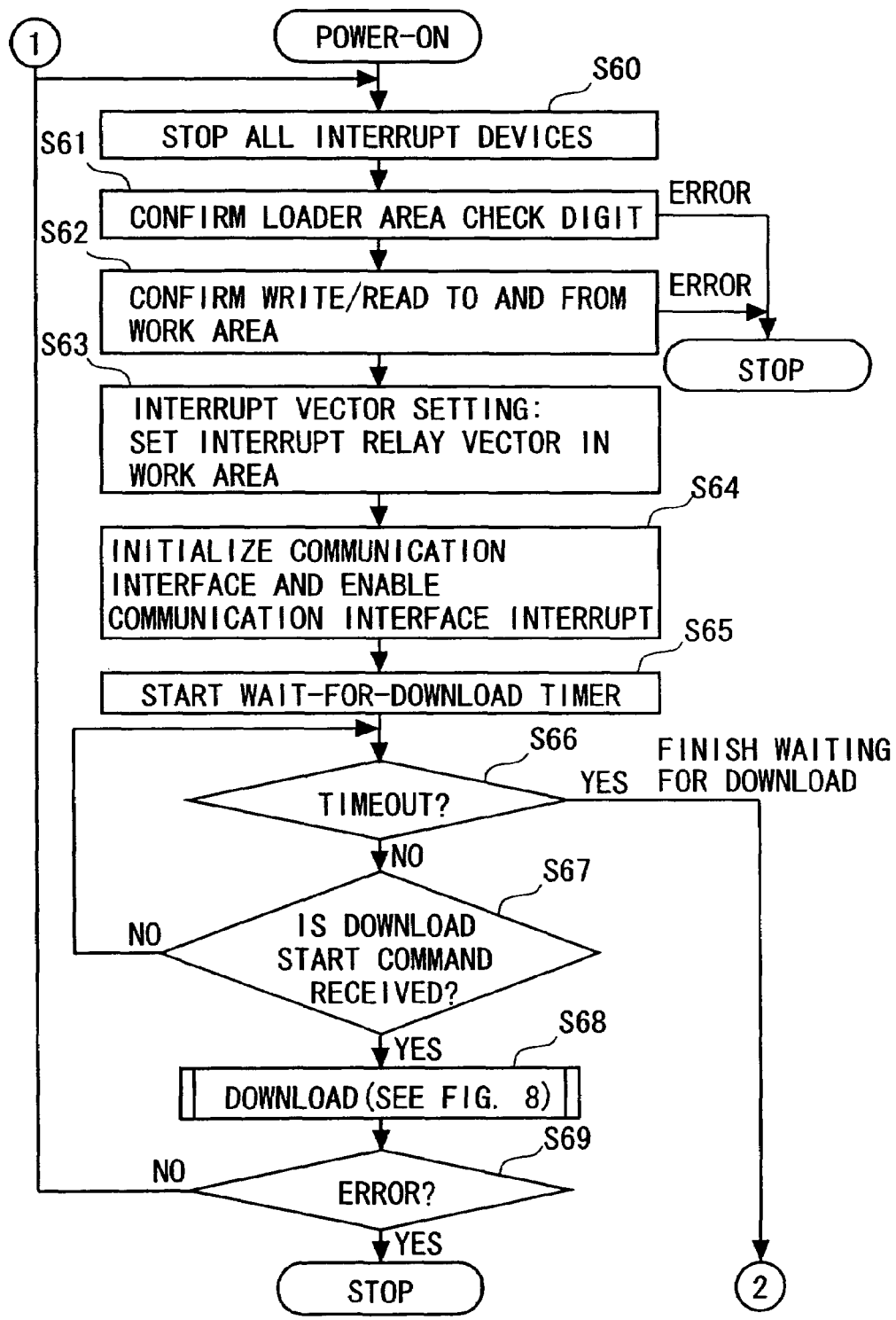
FIG. 6 is an explanatory flowchart showing details of the download process.
Figure 7:
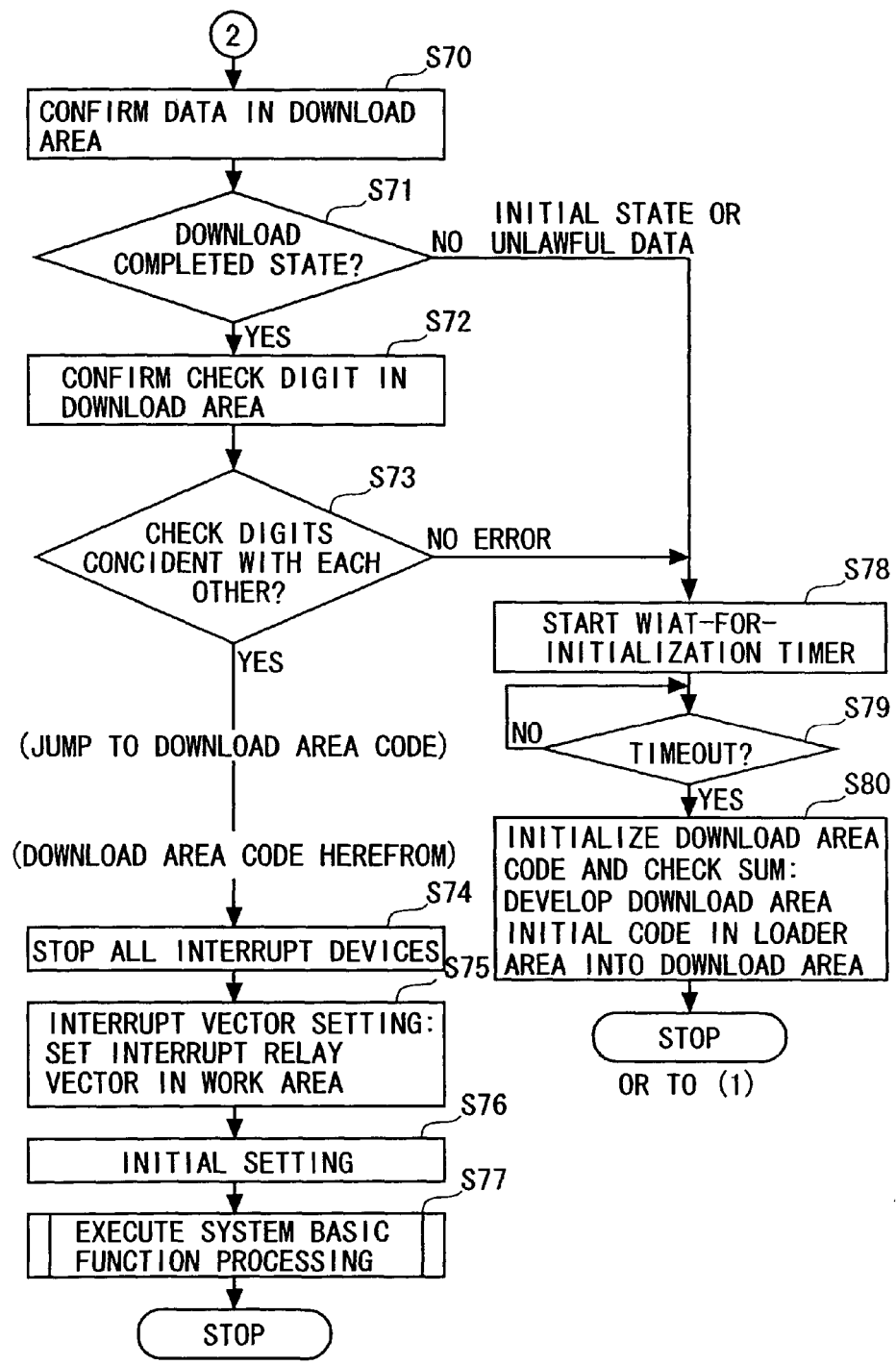
FIG. 7 is an explanatory flowchart showing details of the download process.
Figure 8:
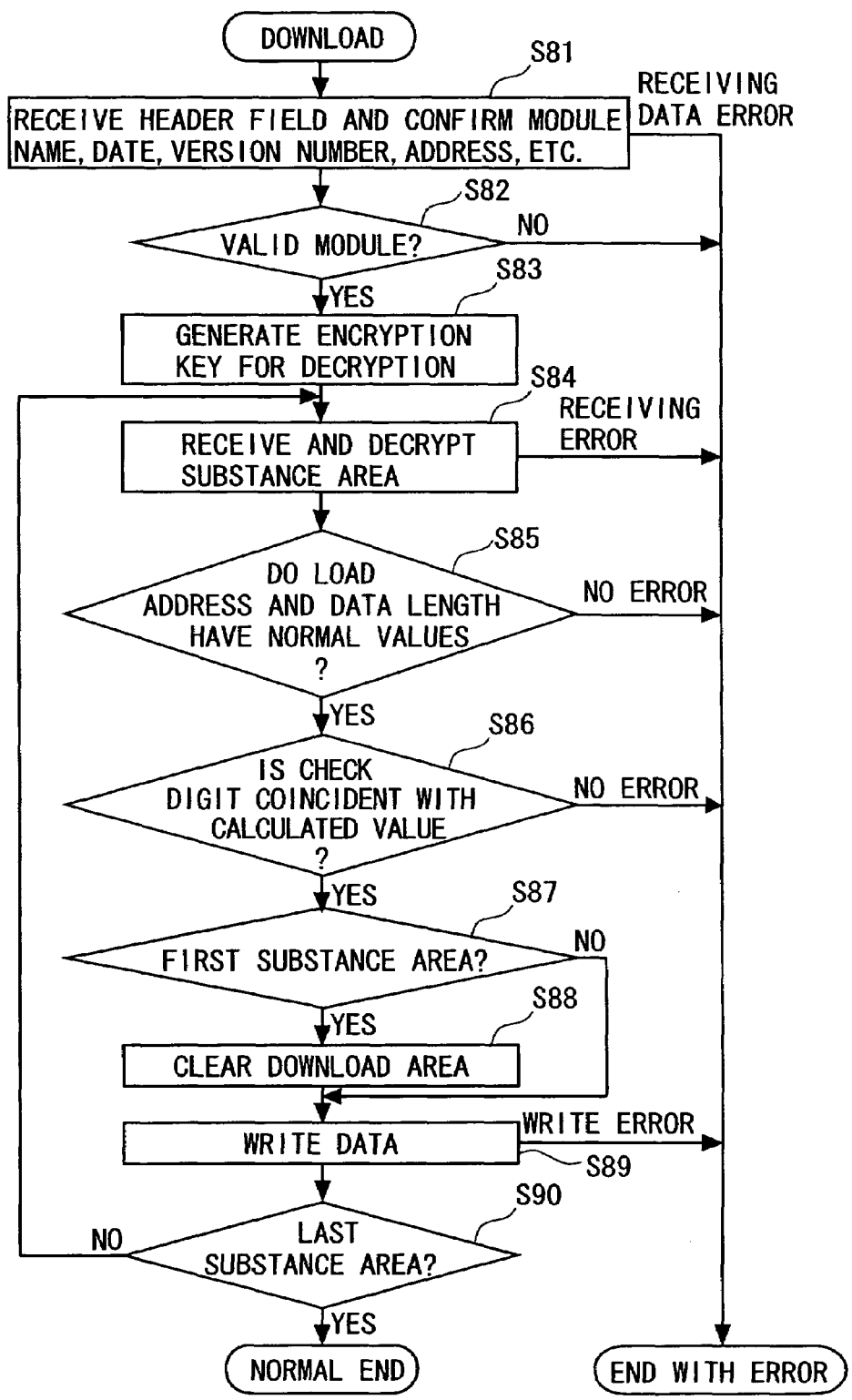
FIG. 8 is an explanatory flowchart showing details of the download process.

Subsequently, details of the download process will be explained referring to FIGS. 1, 3, 4, 6 and 7 in combination. FIGS. 6, 7 and 8 show the processing steps in the case where the download control system 1 shown in FIG. 1 downloads the download module file 20 formatted as shown in FIG. 3 from the host control system.

In this case, the down load module file 20 as the download target is encrypted by the encryption algorithm in the host control system. In the download control system, the CPU 2 executes the download processing program stored in the loader area 6 on the memory unit 3.

Upon switching ON the power source of the download control system 1, the CPU 2 stops accesses from all interrupt devices (processing step S60 in FIG. 6). Then, the CPU 2 compares the check sum calculated from the data in the loader area 6 on the memory unit 3 with the loader area check digit 45 in the loader area 6 on the memory unit, thereby confirming that the contents in the loader area 6 are in a correct status (S61).

Subsequently, the CPU 2 confirms that the process of writing the data to the work area 8 and reading the written data can be normally executed (S62). If an error is detected in the step S61 or S62, the download control system 1 judges that an inoperable state occurs, and stops all the processes.

The CPU 2 sets the interrupt relay vector 48 in the work area 8 on the memory unit 3 (S63). Ensuingly, the CPU 2 initializes the communication interface 4 and enables an interrupt from the communication interface 4 (S64), and thereafter a wait-for-download timer is started up (S65).

The CPU 2, when receiving a download start command from the host control system till the wait-for-download timer becomes timeout (S66, S67), refers to FIG. 8 and executes the download process of the download module file 20, which will be described in detail later on (S68). As a result of this download process, if an error occurs, the CPU 2 stops processing and, if normal, returns to the step S60 (S69).

In step S66 described above, when the CPU 2 detects the timeout of the wait-for-download timer, the wait-for-download status comes to an end, and the CPU 2 moves to processes shown in FIG. 7.

The CPU 2 checks the contents in the download area 7, and judges whether the status is a download-completed status or an initial status or an unlawful error status other than the above (processing step S70 in FIG. 7). This check is judged from whether a predetermined status code is, for instance, written to a specified address in the download area 7 or not.

The CPU 2, in the case of the download-completed status, further compares the check sum calculated from the data in the download area 7 with the download area check digit 47, thereby confirming that the contents in the download area 7 are in the correct status (S71, S72).

If the contents in the download area 7 are in the correct status, the CPU 2 judges that the download area code 46 in the download area 7 is executable, and jumps to the download area code 46 (S73).

The CPU 2, after stopping all the interrupt devices (S74), sets the interrupt relay vector 48 in the work area 8 (S75). Subsequently, the CPU 2, after executing the initial setting (S76), moves to processing the basic functions of the system (S77).

The CPU 2, when detecting the initial status or the unlawful program data in step S71, starts up the wait-for-initialization timer (S78) and, when this timer comes to timeout (S79), initializes the code 46 and the check digit 47 in the download area 7. Namely, the CPU 2 develops the download area initial code 44 in the loader area 6 into the download area 7 (S80).

FIG. 8 shows a download processing routine. In FIG. 8, the CPU 2 receives the information in the header field 21 of the encrypted download module file 20 (see FIG. 3) from the host control system via the communication line 5 and the communication interface 4, and, after storing the received information in the work area 8 on the memory unit 3, checks the program module identifying information 23 in the header field 21. The CPU 2, if there is no error in the receiving data, checks the header field 21 of the received download module file 20 (processing steps S81, S82).

If this download module file 20 is valid, the encryption key for decryption is generated (S83). The encryption key for decryption is generated from the old program data already stored in the specified address in the execution program storage area (download area) 7 and from some items of data in the header field 21 of the received file 20. Herein, some items of data in the header field 21 involve using the module name, the module creation date and the module version number among pieces of program module identifying information 23.

Next, the CPU 2 receives and decrypts the information in the first substance area of the data field 22 of the file 20 (S84), and judges whether or not the decrypted storage start address and data length have normal values (S85).

If the values are normal, the decrypted check digit in the data field 22 is calculated. The CPU 2 judges whether the calculated check digit in the data field 22 is coincident with the check digit in the data field of the received file 20 (S86).

If the check digits are coincident with each other and the first substance area of the data filed 22 is thus identified, the download area 7 on the memory unit 3 is cleared to the initial status (S87, S88). The CPU 2, when judging that the first substance area is not identified, or after clearing the download area 7, writes the receiving program data stored in the work area 8 on the memory unit 3 to the execution program storage area 7 (S89).

The CPU 2 repeats the processes in steps S84 through S89 till it receives the information in the last substance area in the data field 22 and writes the program data to the execution program storage area 7 (S90).

MODIFIED EXAMPLES

Note that a substitute for the DES-CBC cryptography with no change in data size may involve processing the program data in a way that uses a data compression process or a combination of the data compression process and the encryption process. Namely, the encryption algorithm entails the use of a reversible data compression algorithm and an algorithm as a combined version of the reversible data compression algorithm and the encryption algorithm. The data compression leads to a decrease in communication data size (traffic) and enables the time required for downloading to be reduced. In addition, the data compression makes the algorithm complicated and makes it much harder to decipher the download module for an unlawful purpose.

Moreover, the encryption key may be generated from a part or the whole of the program data larger than the data size of the encryption key and from a part or the whole of the identifying information by use of the Hash algorithm based on Hash functions. With this scheme, undetectable elements of the program data and of the identifying information can be reduced even if changed.

The processes in the embodiments discussed above can be provided as a program executable by a computer, and the program can be provided as on a recording medium such as a CD-ROM, a flexible disk, etc. and further via communication lines.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A control system in communication with a host control system and having a download function, comprising:

a first storage element storing execution program data to execute a control function in a rewritable status;

a second storage element to store a download module including fresh pieces of update target execution program data and module identifying information;

a first control unit receive the download module encrypted in the host control system by an encryption key generated from the same program data as the execution program data stored in said first storage element and from the module identifying information, and to store the received download module in said second storage element; and a second control unit to decrypt the download module by an encryption key generated in the control system itself from the execution program data in said first storage element and from the module identifying information of the download module in said second storage element and to replace, when a storage start address, a data length and a check digit that are encrypted in the download module are decrypted into valid values in a plain text, the execution program data in said first storage element with the fresh execution program data decrypted.

2. A control system having a download function according to claim 1, further comprising a third control unit to control the control system to receive the download module including the fresh execution program data for a predetermined fixed period of time after starting the download function.

3. A control system having a download function according to claim 2, further comprising a fourth control unit to control the control system to receive the download module including the fresh execution program data by restarting the download function when receiving a specified reset command in a state of being unable to receive the download module.

4. A control system having a download function according to claim 2 or 3, further comprising a third storage element to store a loader executed first when starting the download function, to store the download module in said second storage element and to execute the execution program data for the control function that are stored in said first storage element.

5. A control system having a download function according to claim 4, further comprising a fifth control unit controlling the control system to make the execution program data in said first storage element executable by the loader when a check digit value obtained as a result of calculation based on all pieces of data in the execution program data in said first storage element, is coincident with data in a specified address in the execution program data in said first storage element.

6. A control system having a download function according to claim 5, further comprising a sixth control unit to store the execution program data, executable and stored in said first storage element, in said third storage element stored with the loader, and to restore the control function by storing said first storage element with the loader's own execution program data in said third storage element when judging that the execution program data can not be executed as a result of checking the execution program data in said first storage element upon a startup of the loader.

7. A control system having a download function according to claim 6, further comprising an eighth control unit to set a queuing time till the loader's own execution program data are stored in said first storage element, and restricting a repetition of initializing said first storage element by the loader and storing said second storage element with the download module containing unlawful execution program data.

8. A control system having a download function according to claim 5, further comprising a seventh control unit to enable the fresh execution program data to be stored by initializing said first storage element into a known status when judging that the execution program data can not be executed as a result of checking the execution program data in said first storage element upon a startup of the loader.

9. A control system having a download function according to claim 8, further comprising a ninth control unit to set a queuing time till said first storage element is initialized by the loader, and restricting a repetition of initializing said first storage element by the loader and to store said second storage element with the download module containing unlawful execution program data.

10. A control system having a download function according to claim 1, wherein the download module includinn a fixed-length header field stored with the module identifying information including at least a module name, a module creation date, a module version number and a storage start address, and at least one data field stored with a block length and data having a length corresponding to this block length, and there is encrypted a block having the data field including an actual data length corresponding to the execution program data, a storage start address, the execution program data, pad data for adjusting a data length to a cipherable length and a check digit generated from the above data.

11. A download control method of a control system, comprising:

storing a first storage element with execution program data for executing a control function in a rewritable status;

storing a second storage element with a download module including fresh pieces of update target execution program data and module identifying information;

receiving the download module encrypted in a host control system by an encryption key generated from the same program data as the execution program data stored in said first storage element and from the module identifying information, and storing the received download module in said second storage element; and decrypting the download module by an encryption key generated in the control system itself from the execution program data in said first storage element and from the module identifying information of the download module in said second storage element and replacing, when a storage start address, a data length and a check digit that are encrypted in the download module are decrypted into valid values in a plain text, the execution program data in said first storage element with the fresh execution program data decrypted.

12. A download control method according to claim 11, further comprising controlling the control system to receive the download module including the fresh execution program data for only a predetermined fixed period of time after starting the download function.

13. A download control method according to claim 12, further comprising controlling the control system to receive the download module including the fresh execution program data by restarting the download function when receiving a specified reset command in a state of being unable to receive the download module.

14. A download control method according to claim 12 or 13, further comprising executing first a loader stored in a third storage element, executing the download function by this loader, and executing the execution program data for the control function that are stored in said first storage element when it is normally ended to make the download module receivable by the download function.

15. A download control method according to claim 14, further comprising making the execution program data in said first storage element executable by the loader when a check digit value obtained as a result of a calculation based on all pieces of data in the execution program data in said first storage element, is coincident with data in a specified address in the execution program data in said first storage element.

16. A download control method according to claim 15, further comprising:

storing the execution program data, executable and stored in said first storage element, in said third storage element stored with the loader; and restoring the control function by storing said first storage element with the loader's own execution program data in said third storage element when determining that the execution program data can not be executed as a result of checking the execution program data in said first storage element upon a startup of the loader.

17. A download control method according to claim 16, further comprising setting a queuing time until the loader's own execution program data are stored in said first storage element, and restricting a repetition of initializing said first storage element by the loader and storing said second storage element with the download module containing unlawful execution program data.

18. A download control method according to claim 15, further comprising enabling the fresh execution program data to be stored by initializing said first storage element into a known status when determining that the execution program data can not be executed as a result of checking the execution program data in said first storage element upon a startup of the loader.

19. A download control method according to claim 18, further comprising setting a queuing time until said first storage element is initialized by the loader, and restricting a repetition of initializing said first storage element by the loader and storing said second storage element with the download module containing unlawful execution program data.

20. A download control method according to claim 11, wherein the download module including a fixed-length header field stored with the module identifying information containing at least a module name, a module creation date, a module version number and a storage start address, and at least one data field stored with a block length and data having a length corresponding to this block length, and there is encrypted a block having the data field including an actual data length corresponding to the execution program data, a storage start address, the execution program data, pad data for adjusting a data length to a cipherable length and a check digit generated from the above data.

* * * * *

UNITED STATES PATENT AND TRADEMARK OFFICE
CERTIFICATE OF CORRECTION

| | |
|---|---|
| PATENT NO. | : 7,313,704 B2 |
| APPLICATION NO. | : 10/622509 |
| DATED | : December 25, 2007 |
| INVENTOR(S) | : Takeshi Kashiwada |

It is certified that error appears in the above-identified patent and that said Letters Patent is hereby corrected as shown below:

Column 17, Line 65, after "unit" insert --to--.

Column 19, Line 11, change "includinn" to --including--.

Column 20, Line 35, change "determing" to --determining--.

Signed and Sealed this

Twenty-seventh Day of May, 2008

JON W. DUDAS
*Director of the United States Patent and Trademark Office*